US010229117B2

(12) United States Patent
Cormack et al.

(10) Patent No.: US 10,229,117 B2
(45) Date of Patent: *Mar. 12, 2019

(54) SYSTEMS AND METHODS FOR CONDUCTING A HIGHLY AUTONOMOUS TECHNOLOGY-ASSISTED REVIEW CLASSIFICATION

(71) Applicants: Gordon V. Cormack, Waterloo (CA); Maura R. Grossman, New York, NY (US)

(72) Inventors: Gordon V. Cormack, Waterloo (CA); Maura R. Grossman, New York, NY (US)

( * ) Notice: Subject to any disclaimer, the term of this patent is extended or adjusted under 35 U.S.C. 154(b) by 230 days.

This patent is subject to a terminal disclaimer.

(21) Appl. No.: 15/186,382

(22) Filed: Jun. 17, 2016

(65) Prior Publication Data

US 2016/0371261 A1    Dec. 22, 2016

Related U.S. Application Data

(60) Provisional application No. 62/182,028, filed on Jun. 19, 2015, provisional application No. 62/182,072, filed on Jun. 19, 2015.

(51) Int. Cl.
G06F 17/30    (2006.01)
G06N 99/00    (2019.01)

(52) U.S. Cl.
CPC .. *G06F 17/30011* (2013.01); *G06F 17/30345* (2013.01); *G06F 17/30705* (2013.01); *G06N 99/005* (2013.01)

(58) Field of Classification Search
CPC combination set(s) only.
See application file for complete search history.

(56) References Cited

U.S. PATENT DOCUMENTS 4,839,853 A    6/1989    Deerwester et al.
5,675,710 A    10/1997    Lewis
(Continued)

FOREIGN PATENT DOCUMENTS

CN    103092931    5/2013
WO    WO 2013/010262    1/2013

OTHER PUBLICATIONS

Almquist, "Mining for Evidence in Enterprise Corpora", Doctoral Dissertation, University of Iowa, 2011, http://ir.uiowa.edu/etd/917.
(Continued)

*Primary Examiner* — Shyue Jiunn Hwa
(74) *Attorney, Agent, or Firm* — Bryan Cave Leighton Paisner, LLP

(57) ABSTRACT

Systems and methods for classifying electronic information are provided by way of a Technology-Assisted Review ("TAR") process, specifically an "Auto-TAR" process that limits discretionary choices in an information classification effort, while still achieving superior results. In certain embodiments, Auto-TAR selects an initial relevant document from a document collection, selects a number of other documents from the document collection and assigns them a default classification, trains a classifier using a training set made up of the selected relevant document and the documents assigned a default classification, scores documents in the document collection and determines if a stopping criteria is met. If a stopping criteria has not been met, the process sorts the documents according to scores, selects a batch of documents from the collection for further review, receives user coding decisions for them, and re-trains a classifier using the received user coding decisions and an adjusted training set.

26 Claims, 2 Drawing Sheets

(56) References Cited

U.S. PATENT DOCUMENTS

| | | | |
|---|---|---|---|
| 5,675,819 A | 10/1997 | Schuetze | |
| 6,189,002 B1 | 2/2001 | Roitblat | |
| 6,463,430 B1 | 10/2002 | Brady et al. | |
| 6,678,679 B1 | 1/2004 | Bradford | |
| 6,687,696 B2 | 2/2004 | Hofman et al. | |
| 6,738,760 B1 | 5/2004 | Krachman | |
| 6,751,614 B1 | 6/2004 | Rao | |
| 6,778,995 B1 | 8/2004 | Gallivan | |
| 6,847,966 B1 | 1/2005 | Sommer et al. | |
| 6,888,548 B1 | 5/2005 | Gallivan | |
| 6,954,750 B2 | 10/2005 | Bradford | |
| 6,978,274 B1 | 12/2005 | Gallivan et al. | |
| 7,113,943 B2 | 9/2006 | Bradford et al. | |
| 7,197,497 B2 | 3/2007 | Cossock | |
| 7,272,594 B1 | 9/2007 | Lynch et al. | |
| 7,313,556 B2 | 12/2007 | Gallivan et al. | |
| 7,328,216 B2 | 2/2008 | Hofman et al. | |
| 7,376,635 B1 | 5/2008 | Porcari et al. | |
| 7,440,622 B2 | 10/2008 | Evans | |
| 7,461,063 B1 | 12/2008 | Rios | |
| 7,483,892 B1 | 1/2009 | Sommer et al. | |
| 7,502,767 B1 | 3/2009 | Forman | |
| 7,529,737 B2 | 5/2009 | Aphinyanaphongs et al. | |
| 7,529,765 B2 | 5/2009 | Brants et al. | |
| 7,558,778 B2 | 7/2009 | Carus et al. | |
| 7,574,409 B2 | 8/2009 | Patinkin | |
| 7,574,446 B2 | 8/2009 | Collier et al. | |
| 7,580,910 B2 | 8/2009 | Price | |
| 7,610,313 B2 | 10/2009 | Kawai et al. | |
| 7,657,522 B1 | 2/2010 | Puzicha et al. | |
| 7,676,463 B2 | 3/2010 | Thompson et al. | |
| 7,747,631 B1 | 6/2010 | Puzicha et al. | |
| 7,809,727 B2 | 10/2010 | Gallivan et al. | |
| 7,844,566 B2 | 11/2010 | Wnek | |
| 7,853,472 B2 | 12/2010 | Al-Abdulqader et al. | |
| 7,899,871 B1 | 3/2011 | Kumar et al. | |
| 7,912,698 B2 | 3/2011 | Statnikov et al. | |
| 7,933,859 B1 | 4/2011 | Puzicha et al. | |
| 8,005,858 B1 | 8/2011 | Lynch et al. | |
| 8,010,534 B2 | 8/2011 | Roitblat et al. | |
| 8,015,124 B2 | 9/2011 | Milo et al. | |
| 8,015,188 B2 | 9/2011 | Gallivan et al. | |
| 8,024,333 B1 | 9/2011 | Puzicha et al. | |
| 8,079,752 B2 | 12/2011 | Rausch et al. | |
| 8,103,678 B1 | 1/2012 | Puzicha et al. | |
| 8,126,826 B2 | 2/2012 | Pollara et al. | |
| 8,165,974 B2 | 4/2012 | Privault et al. | |
| 8,171,393 B2 | 5/2012 | Rangan et al. | |
| 8,185,523 B2 | 5/2012 | Lu et al. | |
| 8,189,930 B2 | 5/2012 | Renders et al. | |
| 8,219,383 B2 | 7/2012 | Statnikov et al. | |
| 8,275,772 B2 | 9/2012 | Aphinyanaphongs et al. | |
| 8,296,309 B2 | 10/2012 | Brassil et al. | |
| 8,326,829 B2 | 12/2012 | Gupta | |
| 8,346,685 B1 | 1/2013 | Ravid | |
| 8,392,443 B1 | 3/2013 | Allon et al. | |
| 8,429,199 B2 | 4/2013 | Wang et al. | |
| 8,527,523 B1* | 9/2013 | Ravid | G06F 17/30648 707/749 |
| 8,533,194 B1 | 9/2013 | Ravid et al. | |
| 8,543,520 B2 | 9/2013 | Diao | |
| 8,612,446 B2 | 12/2013 | Knight | |
| 8,620,842 B1 | 12/2013 | Cormack | |
| 8,706,742 B1 | 4/2014 | Ravid et al. | |
| 8,713,023 B1 | 4/2014 | Cormack et al. | |
| 8,751,424 B1 | 6/2014 | Wojcik | |
| 8,838,606 B1 | 9/2014 | Cormack et al. | |
| 8,996,350 B1 | 3/2015 | Dub et al. | |
| 9,122,681 B2 | 9/2015 | Cormack et al. | |
| 9,171,072 B2 | 10/2015 | Scholtes et al. | |
| 9,223,858 B1 | 12/2015 | Gummaregula et al. | |
| 9,235,812 B2 | 1/2016 | Scholtes | |
| 9,269,053 B2 | 2/2016 | Naslund et al. | |
| 9,595,005 B1 | 3/2017 | Puzicha et al. | |
| 9,607,272 B1 | 3/2017 | Yu et al. | |
| 9,886,500 B2 | 2/2018 | George et al. | |
| 2002/0007283 A1 | 1/2002 | Anelli | |
| 2003/0120653 A1 | 6/2003 | Brady et al. | |
| 2003/0139901 A1 | 7/2003 | Forman | |
| 2003/0140309 A1 | 7/2003 | Saito et al. | |
| 2004/0064335 A1 | 4/2004 | Yang | |
| 2005/0010555 A1 | 1/2005 | Gallivan | |
| 2005/0027664 A1 | 2/2005 | Johnson et al. | |
| 2005/0134935 A1 | 6/2005 | Schmidtler et al. | |
| 2005/0171948 A1 | 8/2005 | Knight | |
| 2005/0228783 A1 | 10/2005 | Shanahan | |
| 2005/0289199 A1 | 12/2005 | Aphinyanaphongs et al. | |
| 2006/0074908 A1 | 4/2006 | Selvaraj | |
| 2006/0161423 A1 | 7/2006 | Scott et al. | |
| 2006/0212142 A1 | 9/2006 | Madani et al. | |
| 2006/0242098 A1 | 10/2006 | Wnek | |
| 2006/0242190 A1 | 10/2006 | Wnek | |
| 2006/0294101 A1 | 12/2006 | Wnek | |
| 2007/0122347 A1 | 5/2007 | Statnikov et al. | |
| 2007/0156615 A1 | 7/2007 | Davar et al. | |
| 2007/0156665 A1 | 7/2007 | Wnek | |
| 2007/0179940 A1 | 8/2007 | Robinson et al. | |
| 2008/0052273 A1 | 2/2008 | Pickens | |
| 2008/0059187 A1 | 3/2008 | Roitblat et al. | |
| 2008/0086433 A1 | 4/2008 | Schmidtler et al. | |
| 2008/0104060 A1 | 5/2008 | Abhyankar et al. | |
| 2008/0141117 A1 | 6/2008 | King et al. | |
| 2008/0154816 A1* | 6/2008 | Xiao | G06N 3/02 706/15 |
| 2008/0288537 A1 | 11/2008 | Golovchinsky et al. | |
| 2009/0006382 A1 | 1/2009 | Tunkelang et al. | |
| 2009/0024585 A1 | 1/2009 | Back et al. | |
| 2009/0077068 A1 | 3/2009 | Aphinyanaphongs et al. | |
| 2009/0077570 A1 | 3/2009 | Oral et al. | |
| 2009/0083200 A1 | 3/2009 | Pollara et al. | |
| 2009/0119140 A1 | 5/2009 | Kuo et al. | |
| 2009/0119343 A1 | 5/2009 | Jiao et al. | |
| 2009/0157585 A1 | 6/2009 | Fu et al. | |
| 2009/0164416 A1 | 6/2009 | Guha | |
| 2009/0265609 A1 | 10/2009 | Rangan et al. | |
| 2010/0030763 A1 | 2/2010 | Chi | |
| 2010/0030798 A1 | 2/2010 | Kumar et al. | |
| 2010/0049708 A1 | 2/2010 | Kawai et al. | |
| 2010/0077301 A1 | 3/2010 | Bodnick et al. | |
| 2010/0082627 A1 | 4/2010 | Lai et al. | |
| 2010/0106716 A1 | 4/2010 | Matsuda | |
| 2010/0150453 A1 | 6/2010 | Ravid et al. | |
| 2010/0169244 A1 | 7/2010 | Zeljkovic et al. | |
| 2010/0198864 A1 | 8/2010 | Ravid et al. | |
| 2010/0217731 A1 | 8/2010 | Fu et al. | |
| 2010/0250474 A1 | 9/2010 | Richards et al. | |
| 2010/0253967 A1 | 10/2010 | Privault et al. | |
| 2010/0257141 A1 | 10/2010 | Monet et al. | |
| 2010/0287160 A1 | 11/2010 | Pendar | |
| 2010/0293117 A1 | 11/2010 | Xu | |
| 2010/0306206 A1 | 12/2010 | Brassil et al. | |
| 2010/0312725 A1 | 12/2010 | Privault et al. | |
| 2011/0004609 A1 | 1/2011 | Chitiveli | |
| 2011/0029525 A1 | 2/2011 | Knight | |
| 2011/0029526 A1 | 2/2011 | Knight et al. | |
| 2011/0029527 A1 | 2/2011 | Knight et al. | |
| 2011/0029536 A1 | 2/2011 | Knight et al. | |
| 2011/0047156 A1 | 2/2011 | Knight et al. | |
| 2011/0103682 A1 | 5/2011 | Chidlovskii et al. | |
| 2011/0119209 A1 | 5/2011 | Kirshenbaum et al. | |
| 2011/0125751 A1 | 5/2011 | Evans | |
| 2011/0251989 A1 | 10/2011 | Kraaij et al. | |
| 2011/0295856 A1 | 12/2011 | Roitblat et al. | |
| 2011/0307437 A1 | 12/2011 | Aliferis et al. | |
| 2011/0314026 A1 | 12/2011 | Pickens et al. | |
| 2011/0320453 A1 | 12/2011 | Gallivan et al. | |
| 2012/0047159 A1 | 2/2012 | Pickens et al. | |
| 2012/0095943 A1 | 4/2012 | Yankov et al. | |
| 2012/0102049 A1 | 4/2012 | Puzicha et al. | |
| 2012/0158728 A1 | 6/2012 | Kumar et al. | |
| 2012/0191708 A1 | 7/2012 | Barsony et al. | |
| 2012/0278266 A1 | 11/2012 | Naslund et al. | |
| 2012/0278321 A1 | 11/2012 | Traub | |
| 2014/0108312 A1 | 4/2014 | Knight et al. | |

(56) References Cited

U.S. PATENT DOCUMENTS

| | | |
|---|---|---|
| 2014/0280173 A1 | 9/2014 | Scholtes et al. |
| 2015/0012448 A1 | 1/2015 | Bleiweiss et al. |
| 2015/0310068 A1 | 10/2015 | Pickens et al. |
| 2015/0324451 A1 | 11/2015 | Cormack et al. |
| 2016/0019282 A1 | 1/2016 | Lewis et al. |
| 2016/0371260 A1 | 12/2016 | Cormack et al. |
| 2016/0371262 A1 | 12/2016 | Cormack et al. |
| 2016/0371364 A1 | 12/2016 | Cormack et al. |
| 2016/0371369 A1 | 12/2016 | Cormack et al. |

OTHER PUBLICATIONS

Analytics News Jul. 11, 2013, Topiary Discovery LLC blog, Critical Thought in Analytics and eDiscovery [online], [retrieved on Jul. 15, 2013]. Retrieved from the Internet: URL<postmodern-ediscovery.blogspot.com>.
Bagdouri et al. "Towards Minimizing the Annotation Cost of Certified Text Classification," CIKM '13, Oct. 27-Nov. 1, 2013.
Ball, "Train, Don't Cull, Using Keywords", [online] Aug. 5, 2012, [retrieved on Aug. 30, 2013]. Retrieved from the Internet: URL<ballinyourcourt.wordpress.com/2012/08/05/train-don't-cull-using-keywords/.
Büttcher et al., "Information Retrieval Implementing and Evaluating Search Engines", The MIT Press, Cambridge, MA/London, England, Apr. 1, 2010.
Cormack et al., "Autonomy and Reliability of Continuous Active Learning for Technology-Assisted Review," Apr. 26, 2015.
Cormack et al., "Efficient and Effective Spam Filtering and Re-ranking for Large Web Datasets", Apr. 29, 2010.
Cormack et al., "Engineering Quality and Reliability in Technology-Assisted Review," Jan. 21, 2016.
Cormack et al., "Evaluation of Machine-Learning Protocols for Technology-Assisted Review in Electronic Discovery," Jan. 27, 2014.
Cormack et al., "Evaluation of Machine-Learning Protocols for Technology-Assisted Review in Electronic Discovery," SIGIR 14, Jul. 6-11, 2014.
Cormack et al., "Machine Learning for Information Retrieval: TREC 2009 Web, Relevance Feedback and Legal Tracks", Cheriton School of Computer Science, University of Waterloo.
Cormack et al., "Multi-Faceted Recall of Continuous Active Learning for Technology-Assisted Review," Sep. 13, 2015.
Cormack et al., "Power and Bias of Subset Pooling Strategies", Published Jul. 23-27, 2007, SIGIR 2007 Proceedings, pp. 837-838.
Cormack et al., "Reciprocal Rank Fusion outperforms Condorcet and Individual Rank Learning Methods", SIGIR 2009 Proceedings, pp. 758-759.
Cormack et al., "Scalability of Continuous Active Learning for Reliable High-Recall Text Classification," Feb. 12, 2016.
Cormack et al., "Waterloo (Cormack) Participation in the TREC 2015 Total Recall Track," Jan. 24, 2016.
Godbole et al., "Document classification through interactive supervision of document and term labels", PKDD 2004, pp. 12.
Grossman et al., "Technology-Assisted Review in E-Discovery Can Be More Effective and More Efficient Than Exhaustive Manual Review", XVII Rich. J.L. & Tech. 11 (2011), http://jolt.richmond.edu/v17i3/article11.pdf.
Lad et al., "Learning to Rank Relevant & Novel Documents Through User Feedback", CIMM 2010, pp. 10.
Lu et al., "Exploiting Multiple Classifier Types with Active Learning", GECCO, 2009, pp. 1905-1908.
Pace et al., "Where the Money Goes: Understanding Litigant Expenditures for Producing Electronic Discovery", RAND Institute for Civil Justice, 2012.
Pickens, "Predictive Ranking: Technology Assisted Review Designed for the Real World", Catalyst Repository Systems, Feb. 1, 2013.
Safadi et al., "active learning with multiple classifiers for multimedia indexing", Multimed. Tools Appl., 2012, 60, pp. 403-417.
Shafiei et al., "Document Representation and Dimension Reduction for Text Clustering", Data Engineering Workshop, 2007, pp. 10.
Seggebruch, "Electronic Discovery Utilizing Predictive Coding", Recommind, Inc. [online], [retrieved on Jun. 30, 2013]. Retrieved from the Internet: URL<http://www.toxictortlitigationblog.com/Disco.pdf>.
Wallace et al., "Active Learning for Biomedical Citation Screening," KDD' 10 , Jul. 25-28, 2010.
Webber et al., "Sequential Testing in Classifier Evaluation Yields Biased Estimates of Effectiveness," SIGIR '13, Jul. 28-Aug. 1, 2013.
Forman, "An extensive Empirical Study of Feature Selection Metrics for Text Classification," Journal of Maching Learning Research 3 (2003) 1289-1305.
Yang, et al. "Inflection points and singularities on C-curves," Computer Aided Geometric Design 21 (2004) pp. 207-213.

* cited by examiner

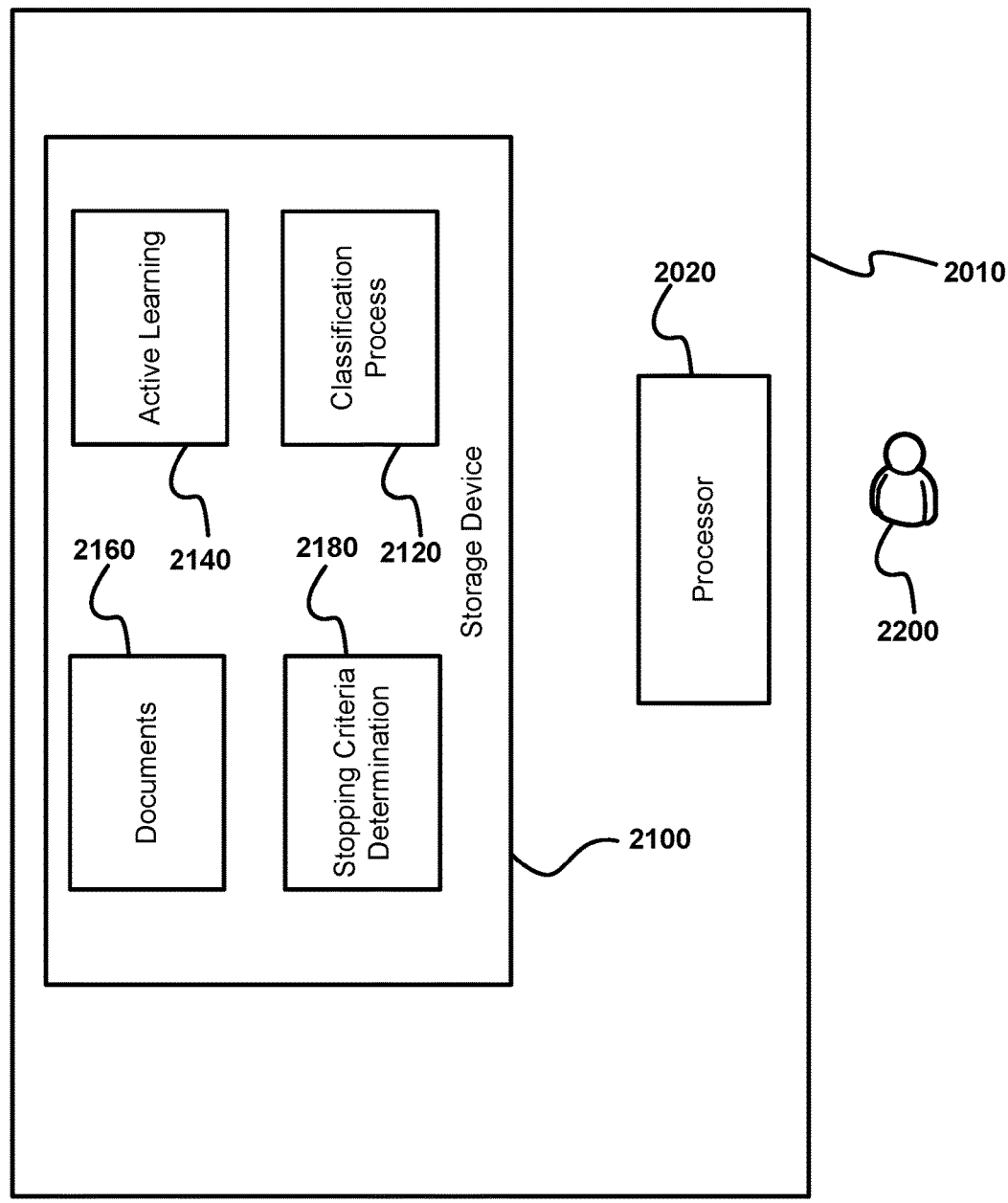

SYSTEMS AND METHODS FOR CONDUCTING A HIGHLY AUTONOMOUS TECHNOLOGY-ASSISTED REVIEW CLASSIFICATION

CROSS-REFERENCE TO RELATED APPLICATIONS

The present application claims the benefit of U.S. Provisional Application No. 62/182,028, filed on Jun. 19, 2015, entitled "Systems and Methods for Conducting and Terminating a Technology-Assisted Review, and U.S. Provisional Application 62/182,072, filed on Jun. 19, 2015, entitled "Systems and Methods for Conducting a Highly Autonomous Technology-Assisted Review."

The present application is also related to concurrently filed U.S. patent application Ser. No. 15/186,360 (published as U.S. Patent Publication No. 2016/0371364 entitled "Systems and Methods for Conducting and Terminating a Technology-Assisted Review" by Cormack and Grossman (herein after "Cormack I").

The present application is also related to concurrently filed U.S. patent application Ser. No. 15/186,366 (published as U.S. Patent Publication No. 2016/0371260) entitled "Systems and Methods for Conducting and Terminating a Technology-Assisted Review" by Cormack and Grossman (herein after "Cormack II").

The present application is also related to concurrently filed U.S. patent application Ser. No. 15/186,377 (published as U.S. Patent Publication No. 2016/0371369) entitled "Systems and Methods for Conducting and Terminating a Technology-Assisted Review" by Cormack and Grossman (herein after "Cormack III").

The present application is also related to concurrently filed U.S. patent application Ser. No. 15/186,387 (published as U.S. Patent Publication No. 2016/0371262) entitled "Systems and Methods for a Scalable Continuous Active Learning Approach to Information Classification" by Cormack and Grossman (herein after "Cormack V").

The present application is also related to U.S. application Ser. No. 13/840,029 (now, U.S. Pat. No. 8,620,842), filed on Mar. 15, 2013 entitled "Systems and methods for classifying electronic information using advanced active learning techniques" by Cormack and Grossman and published as U.S. Patent Publication No. 2014/0279716 (herein after "Cormack VI").

The contents of all of the above-identified applications and patent publications are hereby incorporated by reference in their entireties.

FIELD OF THE INVENTION

The present invention relates generally to information processing and document classification. More particularly, the present invention relates to systems, methods and computer readable media for conducting a highly autonomous technology-assisted review process that minimizes user interaction in order to efficiently classify and rank each one of a plurality of documents in a collection of electronically stored information.

BACKGROUND

Technology-assisted review ("TAR") involves the iterative retrieval and review of documents from a collection until a substantial majority (or "all") of the relevant documents have been reviewed or at least identified. At its most general, TAR separates the documents in a collection into two classes or categories: relevant and non-relevant. Other (sub) classes and (sub) categories may be used depending on the particular application.

Presently, TAR lies at the forefront of information retrieval ("IR") and machine learning for text categorization. Much like with ad-hoc retrieval (e.g., a Google search), TAR's objective is to find documents to satisfy an information need, given a query. However, the information need in TAR is typically met only when substantially all of the relevant documents have been retrieved. Accordingly, TAR relies on active transductive learning for classification over a finite population, using an initially unlabeled training set consisting of the entire document population. While TAR methods typically construct a sequence of classifiers, their ultimate objective is to produce a finite list containing substantially all relevant documents, not to induce a general classifier. In other words, classifiers generated by the TAR process are a means to the desired end (i.e., an accurately classified document collection).

TAR systems and methods including unsupervised learning, supervised learning, and active learning are discussed in Cormack VI. Generally, the property that distinguishes active learning from supervised learning is that with active learning, the learning algorithm is able to choose the documents from which it learns, as opposed to relying on user- or random selection of training documents. In pool-based settings, the learning algorithm has access to a large pool of unlabeled examples, and requests labels for some of them. The size of the pool is limited by the computational effort necessary to process it, while the number of documents for which labels are requested is limited by the human effort required to label them.

Lewis and Gale in "A sequential algorithm for training text classifiers" (*Proceedings of the* 17*th Annual International ACM SIGIR Conference on Research and Development in Information Retrieval*, pages 3-12, 1994) compared three strategies for requesting labels: random sampling, relevance sampling, and uncertainty sampling, concluding that, for a fixed labeling budget, uncertainty sampling generally yields a superior classifier. At the same time, however, uncertainty sampling offers no guarantee of effectiveness, and may converge to a sub-optimal classifier. Subsequent research in pool-based active learning has largely focused on methods inspired by uncertainty sampling, which seek to minimize classification error by requesting labels for the most informative examples. Over and above the problem of determining the most informative examples, there are costs associated with the selection and tuning of various parameters associated with the classification methodology.

Some applications of TAR include electronic discovery ("eDiscovery") in legal matters, systematic review in evidence-based medicine, and the creation of test collections for information retrieval ("IR") evaluation. See G. V. Cormack and M. R. Grossman, Evaluation of machine-learning protocols for technology-assisted review in electronic discovery (*Proceedings of the* 37*th International ACM SIGIR Conference on Research and Development in Information Retrieval*, pages 153-162, 2014); C. Lefebvre, E. Manheimer, and J. Glanville, Searching for studies (*Cochrane handbook for systematic reviews of interventions*. New York: Wiley, pages 95-150, 2008); M. Sanderson and H. Joho, Forming test collections with no system pooling (*Proceedings of the* 27*th Annual International ACM SIGIR Conference on Research and Development in Information Retrieval*, pages 33-40, 2004). As introduced above, in contrast to ad-hoc search, the information need in TAR is typically satisfied only when virtually all of the relevant documents have been discovered. As a consequence, a substantial number of documents are typically examined for each review task. The reviewer is typically an expert in the subject matter, not in IR or data mining. In certain circumstances, it may be undesirable to entrust the completeness of the review to the skill of the user, whether expert or not. In eDiscovery, the review is typically conducted in an adversarial context, which may offer the reviewer limited incentive to conduct the best possible search. In systematic review, meta-analysis affords valid statistical conclusions only if the selection of studies for inclusion is reasonably complete and free of researcher bias. The creation of test collections is subject to similar constraints: the assessors are not necessarily search experts, and the resulting relevance assessments must be reasonably complete and free of selection bias.

For the reasons stated above, it may be desirable to limit discretionary choices in the selection of search tools, tuning parameters, and search strategy. Obviating such choices presents a challenge because, typically, both the topic and the collection are unique for each task to which TAR is applied, and may vary substantially in subject matter, content, and richness. Any topic- or collection-specific choices, such as parameter tuning or search queries, must either be fixed in advance, or determined autonomously by the review tool. It would be beneficial to highly automate these choices, so that the only input that may be required from the reviewer is, at the outset, a short query, topic description, or single relevant document, followed by an assessment of relevance for each document, as it is retrieved.

At the same time, it is important for each TAR task to enjoy a high probability of success. A lawyer engaged in eDiscovery in litigation, or a researcher conducting a meta-analysis or building a test collection, is unlikely to be consoled by the fact that the tool works well on average, if it fails for the particular task at hand. Accordingly, it is important to show that such failures are rare, and that such rare failures are readily apparent, so that remedial actions may promptly be taken.

The literature reports a number of search efforts aimed at achieving high recall, particularly within the context of eDiscovery and IR evaluation. Most of these efforts require extensive intervention by search experts, or prior topic- or dataset-specific training. Recall and other measures associated with information classification are discussed in Cormack VI. Many search and categorization methods are unreliable, in that they fail to achieve reasonable effectiveness for a substantial number of topics, although, perhaps, achieving acceptable effectiveness on average.

Among approaches that meet the underlying criterion of autonomy, the continuous active learning ("CAL") method, and its implementation in Cormack and Grossman's TAR Evaluation Toolkit ("Toolkit"), appears to be the gold standard. See G. V. Cormack and M. R. Grossman, Evaluation of machine-learning protocols for technology-assisted review in electronic discovery (*Proceedings of the 37th International ACM SIGIR Conference on Research and Development in Information Retrieval*, pages 153-162, 2014). The Toolkit can be found at http://cormack.uwaterloo.ca/cormack/tar-toolkit. Yet uncertainties remain regarding its sensitivity to the choice of "seed query" required at the outset, its applicability to topics and datasets with higher or lower richness, its algorithmic running time for large datasets, its effectiveness relative to non-autonomous approaches, and its generalizability to domains beyond eDiscovery.

Indeed, there is an indisputable impact associated with various engineering choices made in designing and executing classification systems. Thus, it would also be beneficial to design a TAR configuration that exhibits greater autonomy, superior effectiveness, increased generalizability, and fewer, more easily detectable failures, relative to existing TAR methods. It would be further beneficial to devise classification systems and methods that achieve improved results (e.g., high-recall) while also reducing the need for "tuning parameters" (customizing the classification effort) for the particular problem at hand.

SUMMARY OF PARTICULAR EMBODIMENTS OF THE INVENTION

The invention provides novel systems and methods for classifying information such that classifiers generated during iterations of the classification process will be able to accurately classify information for an information need to which they are applied (e.g., accurately classify documents in a collection as relevant or non-relevant) and thus, achieve high quality (e.g., high recall). In addition, these novel systems and methods will also provide increased autonomy while also reducing the need for parameterization as compared to other classification techniques.

Systems and computerized methods for classifying information are provided. The systems and methods receive an identification of a relevant document, which is used as part of a training set. The systems and methods also select a first set of documents from a document collection. The documents are part of a document collection, which is stored on a non-transitory storage medium. The systems and methods further assign a default classification to the first set of documents, which are used as a training set. Using the training set, the systems and methods train a classifier and score documents in the document collection using the classifier. If a stopping criteria is reached, the systems and methods classify one or documents in the document collection using the classifier. If a stopping criteria has not been reached, the systems and methods select a second set of documents for review and present one or more documents in the second set of documents to a reviewer. The systems and methods further receive from the reviewer user coding decisions associated with the presented documents. The systems and methods also add the presented documents for which user coding decisions were received to the training set. The systems and methods further remove documents in the first set of documents from the training set and add a third set of documents from the document collection to the training set. The systems and methods further assign a default classification to the third set of documents. The systems and methods further train and/or update a classifier using the training set. The systems and methods also increase the size of the second set of documents and repeat the steps of scoring and determining whether a stopping criteria has been reached.

In certain embodiments, the number of documents presented for review is increased between iterations. In certain embodiments, the percentage of increase is predetermined. In certain embodiments, the number of documents presented for review is varied between iterations or is selected to achieve an effectiveness target. In certain embodiments, the size of the second set of documents is increased exponentially.

In certain embodiments, the stopping criteria is the exhaustion of the first set of documents. In certain embodiments, the stopping criteria is a targeted level of recall. In certain embodiments, the stopping criteria is a targeted level of $F_1$.

In certain embodiments, the systems and methods further sort the scored documents and present the highest scored documents to the reviewer for review. In certain embodiments, the default classification assigned to documents in the first set or third set of documents is "non-relevant." In certain embodiments, the documents in the first or third sets are selected randomly. In certain embodiments, the identified relevant document is a synthetic document.

BRIEF DESCRIPTION OF THE DRAWINGS

The inventive principles are illustrated in the figures of the accompanying drawings which are meant to be exemplary and not limiting, and in which:

FIG. 2 is a block diagram illustrating components of a system suitable for use in an information classification platform according to certain embodiments.

DETAILED DESCRIPTION OF EMBODIMENTS OF THE INVENTION

Figure 1:
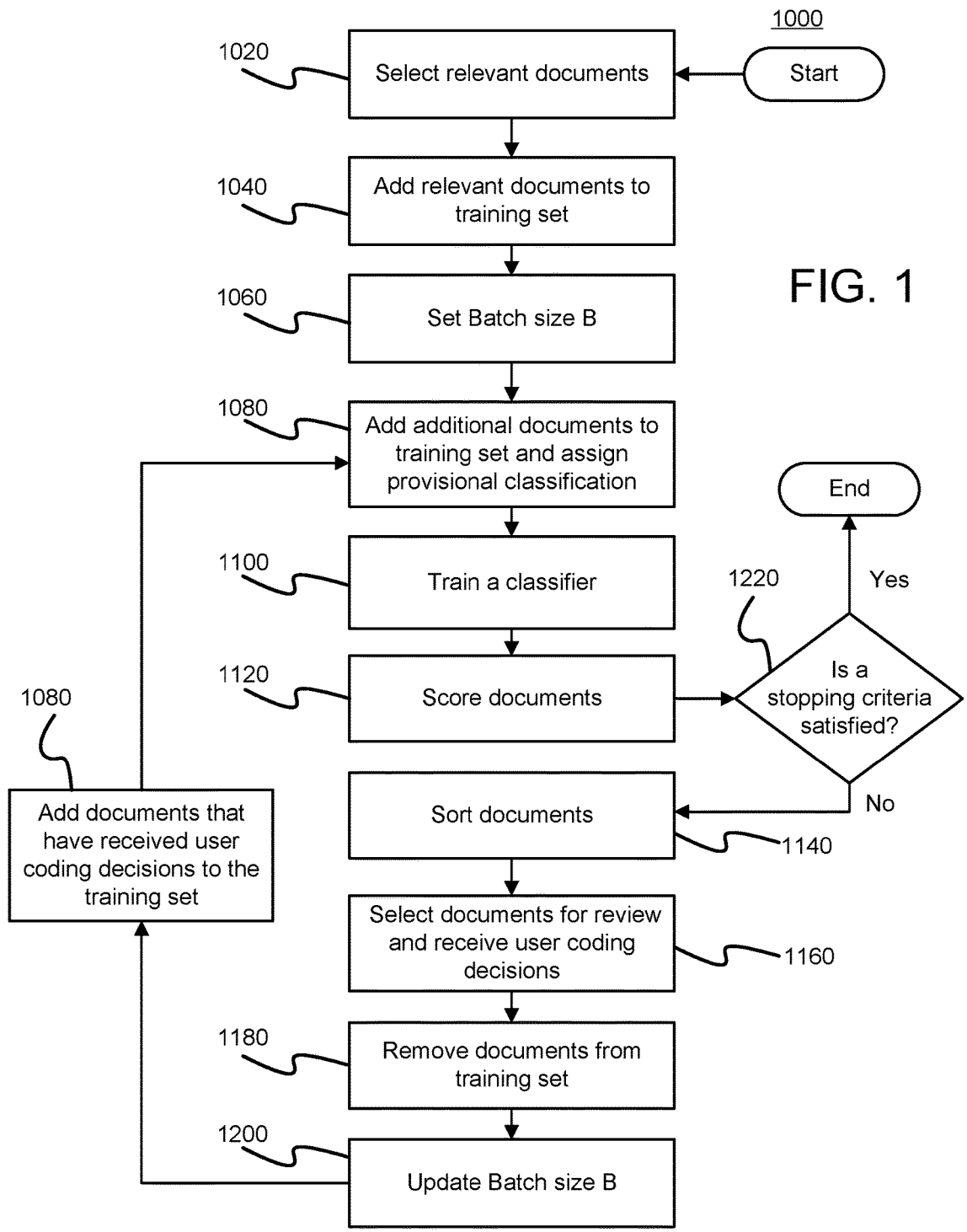
FIG. 1 is a flow diagram illustrating a highly-autonomous TAR process for classifying information in accordance with some embodiments of the present invention.

A commonly expressed sentiment in eDiscovery is that there can be no "one size fits all" TAR solution, suggesting that it is necessary to select tools and strategy with knowledge of the topic and dataset, and that some tools are more appropriate in some situations. Generally speaking, however, in the absence of specific foreknowledge, Autonomous Technology-Assisted Review ("Auto TAR") is able to yield better recall, with less effort, than other known tools or strategies.

Auto TAR demonstrates that reasonable and reliable results can be achieved without discretionary input to the TAR process, thereby avoiding the risk of negative bias. It may be that Auto TAR, by providing a floor level of effectiveness, can still make use of discretionary input, while avoiding the downside risk. For example, the user might provide additional seed documents or queries, either when Auto TAR appears to be stuck, or to ensure that all aspects of relevance are covered, if it could be known that Auto TAR would achieve at least its floor level of effectiveness.

The AutoTAR systems and methods preferably use a single relevant seed document, instead of the 1,000-document seed set in Cormack and Grossman's CAL implementation. This decision was motivated by several factors. Perhaps most important, was the desire to avoid the situation in which the seed set contained no relevant examples, and hence no basis for relevance feedback. Consistent with this purpose, random search, although it could be employed, is not preferable because the expected effort to find a relevant document—on the order of 1/p where p is the prevalence (or proportion) of relevant documents in the collection—would be significant when prevalence was low. Even in situations where the seed set contained one or several relevant documents, using such a sparse training set may increase the likelihood of overfitting while setting the regularization and other parameters for certain classification techniques (e.g., Support Vector Machine ("SVM") implementations). One of Cormack and Grossman's examples (Topic 203, CAL and Simple Active Learning ("SAL"), with random seed) appears to exhibit this abnormality. See G. V. Cormack and M. R. Grossman, Evaluation of machine-learning protocols for technology-assisted review in electronic discovery (*Proceedings of the 37th International ACM SIGIR Conference on Research and Development in Information Retrieval*, pages 153-162, 2014).

The motivation to use a single relevant seed document also stemmed in part from criticism of the mechanism to determine its content. It has been argued that unless the seed set is "representative of the collection," a TAR effort may fail to yield adequate recall, and that using keywords or other judgmental techniques may "bias" the result. See K. Schieneman and T. Gricks, The implications of Rule 26(g) on the use of technology-assisted review (*Federal Courts Law Review*, 7(1):239-274, 2013). Accordingly, it is desirable to minimize and isolate the judgmental input needed to initiate the TAR process, so as to analyze its impact. To this end, three methods of selecting the seed document are identified: random selection, ad-hoc search (e.g., BM25), and synthetic document creation.

The first alternative is random selection. While random selection certainly limits discretionary input, such a method may not be a generally applicable method, due to the low-prevalence issue referenced above. For this use case, a randomly selected document can be seen as a proxy for a relevant document already known to the user, or identified by any number of methods. If a random document is nearly always suitable, so should such a convenience-sampled document. For the second alternative, the top-ranked (e.g., according to BM25) relevant document from an ad hoc search might be more effective, or more reliable, than a random one. But in certain scenarios, it might be worse, potentially resulting in a myopic review (one that cannot identify certain types of relevant documents). The use of a BM25 seed document is predicated on a two-phase approach: an ad hoc search to find a document, followed by Auto TAR. Generally, ad hoc search will yield a relevant document in the first several attempts; if not, the failure will be readily apparent and the user will reformulate the query rather than reviewing to an absurd depth in the ranking (e.g., the $20^{th}$ results page of a Google search).

For the third alternative, a synthetic document consisting of a description of the subject matter may make a good seed document for the same reason that such a document would provide a reasonable query for a relevance-ranking algorithm for ad hoc IR. In addition, the use of a synthetic seed document offers the simplicity of a turnkey approach. The impact of these approaches can also be measured by their expected effort. For a synthetic seed, there is no search effort; for a BM25 seed, the search effort is usually de minimus; for a truly random seed, the effort is on the order of 1/p; for an arbitrary seed, there is no search effort provided at least one relevant document is known.

When the seed set is restricted to a single relevant seed document, there are no non-relevant documents with which to train the classifiers, rendering them unable to find a meaningful decision boundary. Instead of having the reviewer assess random documents for this purpose, one approach is to randomly select a number of documents (e.g., 100 documents) and presumptively and temporarily label them "not relevant" for the purpose of training classifiers. This procedure is repeated—augmenting the training set by a different set of randomly selected documents (e.g., 100 documents), presumptively labeled "not relevant," from the documents yet to be reviewed—for each iteration of the classification process employing relevance feedback. The rationale is as follows: For low prevalence topics (p<<0.01), there will likely be no relevant documents among those presumptively labeled "not relevant"; for high prevalence topics (0.01<<p<0.5), there will likely be some relevant documents, but even more non-relevant documents, and it is unlikely that the resulting classifiers will be so poorly trained as to be unable to find sufficient relevant documents to proceed, given their high prevalence. Moreover, the choice of a different set of non-relevant examples introduces enough nondeterminism that poor training is unlikely to persist through several iterations. The intermediate case of p approx. 0.01 falls between the extremes; it should fare no worse.

It is believed that the nondeterminism introduced by the use of random presumptively non-relevant examples might aid in the coverage of diverse aspects of the topics, for much the same reason that randomization can help hill-climbing methods avoid local optima. For certain classification efforts, increasing the size of the set of documents to 1,000 appeared to degrade performance. This particular performance degradation may be due to such a large set smoothing the randomness or that the classifiers are simply overfit with this large an imbalance between relevant and non-relevant examples.

The results, however, indicate that there is little difference, if any, beyond chance in choosing between a seed selected randomly, a seed selected by chance (e.g., a relevant document already known to the user, or identified by any number of methods), and a synthetic seed constructed from the topic description. Further results indicated that chance variation between runs (due to the selection of the seed document, as well as the selection of the presumptively non-relevant training examples) was much larger than any systematic difference between seeding methods.

Instead of using a batch size of 1,000 for relevance feedback as shown in Cormack and Grossman in SIGIR 2014, the boundary case of using a batch size of 1 was employed (i.e., retraining the classifiers and selecting the single highest-ranked document). This minimal batch size may afford the process the greatest possible opportunity to learn, and hence to achieve high precision. On the other hand, it may deprive the algorithm of sufficient real (as opposed to presumptive) non-relevant examples to clearly mark the decision boundary. See D. Sculley, Practical learning from one-sided feedback (*Proceedings of the* 13*th ACM SIGKDD International Conference on Knowledge Discovery and Data Mining*, pages 609-618, 2007). Use of this minimal batch size, however, is met with the formidable problem that the overall running time of such a solution is $\Omega(n^2)$, where n is the size of the collection, by virtue of the fact that it is necessary to re-score the collection (or, at least, those documents not yet reviewed) n times. Furthermore, if the training time T(n) is superlinear, the lower bound rises to $\Omega(n \cdot T(n))$. Generally, a method with quadratic time complexity is not preferable for TAR applications.

Thus, to reap the benefits of early precision, while avoiding downside risk and excessive running time, exponentially increasing batch sizes may be used. For example, an initial batch size of 1 may be used, and increased at each step by the smallest number of documents greater than 10%. A growth rate of 10% was chosen because it resulted in about the same number of iterations, and hence similar computation time, as the fixed batch size of 1,000 used in Cormack and Grossman's Toolkit. It is easy to show that the asymptotic running time of this approach is $O(n \log n+T(n))$, assuming that an $O(n \log n)$ sorting algorithm is used to select the top-ranked documents.

The above features—a single relevant seed document, presumptively labeled "not relevant" examples, exponential batch sizes, either alone or in combination with others (e.g., tf-idf features or $SVM^{light}$)—improve recall, especially at lower effort levels, and almost always improve, not only on CAL (which is reaffirmed to be consistently superior to Simple Active Learning ("SAL") and Simple Passive Learning ("SPL")), but on the best reported results for interactive search and judging, as well as interactive relevance feedback.

In addition to the benefits provided by Auto TAR, improvements concerning when to terminate the TAR process are also contemplated. For example, the gain curves resulting from TAR processes show clearly diminishing returns at some point, but do not show exactly how many more relevant documents remain to be found. The results indicate that if a substantial number of relevant documents are found with high precision, and then precision drops, the vast majority of relevant documents have likely been found and thus, it may be possible to terminate the review. Systems and methods for employing gain curves in the determination of whether to stop a classification process are discussed in Cormack I, Cormack II, and Cormack III.

As an alternative or supplement to the techniques described in Cormack VI, methods for a highly autonomous technology-assisted review are described. In accordance, with certain embodiments described in Cormack VI, a highly autonomous technology-assisted review minimizes the use of seed sets. In fact, review and classification can begin with as few as one "relevant" document. The methods described herein can be used in accordance with the systems and methods described in Cormack VI.

The system and methods described and claimed herein are particularly useful for transforming an unclassified collection of information into a collection of classified information by generating and applying one or more classifiers to the unclassified information (e.g., documents). Beyond effecting this particular transformation, the systems and methods described and claimed herein are more efficient than other systems and methods for classifying information, while still maintaining overall classification accuracy. The systems and methods described herein reduce the number of discretionary choices made in a classification process. Reducing the number of discretionary choices improves repeatability across multiple classification efforts and document collections. The systems and methods described herein also reduce running times for similar sized data sets when compared to other systems and methods. Thus, the efficiencies of the systems and methods described and claimed herein are not merely based on the use of computer technology to improve classification speed. Instead, these systems and methods represent a fundamental improvement in at least the field of information classification by virtue of their overall configuration.

FIG. 1 illustrates an exemplary method 1000 for classifying documents using a continuous active learning approach. In step 1020, at least one relevant document is selected. This relevant document may be selected using an ad-hoc (e.g., keyword) search of the document collection. In some embodiments, a document is automatically selected based upon its rank in one or more keyword searches. For example, the highest ranked document (most relevant) may be selected. Results from more than one keyword searches may be aggregated to form a combined score. Alternatively, the document may be a synthetic document generated to represent/approximate a document that would be relevant. In certain embodiments, the synthetic document is created from a request for production (e.g., by removing boilerplate). Synthetic documents and various techniques for selecting documents (e.g., ad-hoc searches) from a document collection are discussed in Cormack VI. See e.g., Cormack VI, ¶¶ 65-70, 184-190. In step 1040, the one or more selected documents may be added to a training set.

In step 1060, a batch size B may be set for the iteration. For example, if a single document is chosen, B=1. In step 1080, one or more documents may be added to the training set. For example, 100 documents may be added to the training set. In certain embodiments, the number of documents added is proportional (e.g., 50×) to the number of relevant documents selected in step 1020 and/or added in step 1040. In a preferred embodiment, these documents are selected randomly. Also in step 1080, these documents may be assigned a provisional classification. In a preferred embodiment, the documents are assigned a provisional classification of "non-relevant." In certain embodiments, the documents are assigned a provisional classification of "relevant." In certain embodiments, the documents are assigned a mixture of provisional classifications (e.g., "relevant" and "non-relevant"). When assigning a mixture of provisional classifications, the assignments may be made in any suitable proportion. In certain embodiments, documents that have been reviewed by a reviewer and assigned a user coding decision during one or more previous iterations of a classification process (e.g., a CAL process) are added to the training set. These documents may be added to the training set in addition to or instead of the documents previously discussed (e.g., randomly selected documents). In preferred embodiments, these previously reviewed documents are not assigned a provisional classification.

In step 1100, one or more classifiers are trained using document information profiles for the documents in the training set, received user coding decisions, and/or provisional classifications. The classifier may be generated in any known manner. For example, Cormack VI, describes systems and methods for generating/training a classifier using document information profiles (e.g., n-grams) and user coding decisions (e.g., relevant, non-relevant). See e.g., Cormack VI, ¶¶ 90-119. In certain preferred embodiments, classifiers are generated and updated using logistic regression. In certain embodiments, such a classifier may be generated using Sofia ML and/or SVM$^{light}$.

In step 1120, scores are generated for the documents in the collection by applying the one or more classifiers to their corresponding document information profiles. The document score may be generated in any known manner. For example, Cormack VI describes systems and methods for generating a document score using a classifier and a document information profile. See e.g., Cormack VI, ¶¶ 90-123. Preferably, the one or more scored documents include the provisionally classified documents (e.g., selected in step 1020). In step 1140, the documents may be sorted according to their scores. In preferred embodiments, the documents are sorted using a sorting algorithm with run-time O(n log n).

In step 1160, a number of documents may be selected for review and user coding decisions are received. The documents may be selected in any manner. Various techniques (e.g., use of relevance feedback) for selecting documents from a document collection and user coding decisions are discussed in Cormack VI. See e.g., Cormack VI, ¶¶ 65-70, 184-190. In certain embodiments, the documents are selected from the training set. In certain embodiments, the number of documents selected for review is based upon the batch size B. In preferred embodiments, the number of documents selected for review is equal to B. In certain embodiments, the documents are selected according to their scores. In certain preferred embodiments, likely relevant documents (e.g., those with high scores) are selected.

In step 1180, one more documents previously added to the training set are removed. For example, all documents added to the training set and previously assigned a provisional classification (e.g., as discussed with respect to step 1080) may be removed from the training set. In certain embodiments, documents previously assigned a provisional classification are not removed from the training if they have received a user coding decision (e.g., as discussed with respect to step 1160).

At step 1200, batch size B is updated. In a preferred embodiment, B is increased by $$\left\lceil \frac{B}{10} \right\rceil.$$

As indicated in step 1220, the process may continue back to step 1080 until a stopping criteria is satisfied. Any suitable stopping criteria may be used. More specifically, any of the stopping criteria for TAR processes discussed in Cormack I-III or Cormack V-VI, each of which are incorporated by reference may be used. For example, in addition or as an alternative, a determination of marginal precision or suitable ad-hoc techniques may also be used as a stopping criteria. In certain embodiments, a stopping criteria is reached after a sufficient number of documents from the document collection have been reviewed and/or assigned user coding decisions. In certain embodiments, a stopping criteria is reached at a targeted level of recall. In certain embodiments, a stopping criteria is reached at a targeted level of $F_1$.

In certain embodiments, the process may continue back to step 1020 (i.e., start over) based upon received coding decisions. For example, when selecting likely relevant documents in step 1160, after receiving one or more user coding decisions (or a certain percentage of classifications) labeling the selected document as "not relevant," the process may return to step 1020.

FIG. 2 is an exemplary system 2000 for performing the methods discussed with respect to FIG. 1 of the instant disclosure. The system 2000 may include a computing device 2010 and reviewer/user 2200. Computing device 2010 may further include a processor 2020 and storage device 2100. Storage device 2100 may be a hard disk, RAM, ROM, CD-ROM, and/or any other suitable non-transitory computer readable media. The methods discussed and described with respect to FIG. 1 of the instant disclosure may be stored as instructions in one more modules (e.g., classification process 2120, active learning 2140, and stopping criteria determination 2180, or other suitable modules) and executed on a processor (e.g., processor 2020). Documents (e.g., selected documents or documents of a document collection) and/or document information profiles may also be stored in one or more storage devices (e.g., storage device 2100).

In addition, the systems and platforms described with respect to FIGS. 1-3 and 10 of Cormack VI, which is incorporated by reference herein in its entirety, may be used either independently, combined, or in conjunction with other components as part of a classification system configured to perform the methods discussed and described with respect to FIG. 1 of the instant disclosure. For example, a classification system implementing the methods described with respect to FIG. 1 may be implemented on a single device (e.g., a standard PC computer, tablet, laptop, smartphone, or other device). Such a device may run a standard operating system (e.g., Windows, Linux, OSX, Android, iOS) and the classification system is conventionally installed as one or more programs or libraries on the device itself. When the device is, for example, a laptop, tablet, or smartphone, the classification system is easily transportable. For example, the methods discussed and described with respect to FIG. 1 of the instant disclosure may be stored in storage device 226 or 244 of Cormack VI FIGS. 3 and 10 as instructions, which may be executed on processors 224 or 242 of Cormack VI FIGS. 3 and 10. Such a device may or may not be further connected to one or more computers or other devices via a network. Alternatively, a classification system implementing the methods described with respect to FIG. 1 may be distributed across a plurality of devices in communication with one another (e.g., over a network) as in FIG. 2 of Cormack VI. For example, the methods discussed and described with respect to FIG. 1 of the instant disclosure may be stored in storage device 226 and/or 244 of Cormack VI FIGS. 2, 3, and 10 as instructions, which may be executed on processors 224 and/or 242 of Cormack VI FIGS. 2, 3, and 10. Alternatively, the classification system implementing the methods described with respect to FIG. 1 may be contained on computer readable media (e.g., a CD, hard disk, USB drive, and/or other bootable media) which, when inserted or coupled to the device, causes the classification system to be run entirely on the device or more than one device. Such a device may or may not be further connected to one or more computers or other devices via a network.

One of ordinary skill in the art will appreciate that, aside from providing advantages in e-discovery review, the improved active learning systems, methods and media discussed throughout the disclosure herein may be applicable to a wide variety of fields that require data searching, retrieval, and screening. This is particularly true for applications which require searching for predetermined information or patterns within electronically stored information (regardless of format, language and size), especially as additional documents are added to the collection to be searched. Exemplary areas of potential applicability are law enforcement, security, and surveillance, as well as internet alert or spam filtering, regulatory reporting and fraud detection (whether within internal organizations or for regulatory agencies).

For example, in law enforcement, security, and for surveillance applications, the principles of the invention could be used to uncover new potential threats using already developed classifiers or to apply newly-classified information to discover similar patterns in prior evidence (e.g., crime or counter-terrorism prevention, and detection of suspicious activities). As another example, the principles of the invention could be used for healthcare screening using already developed classifiers or to apply newly-classified information to discover similar patterns in prior evidence (e.g., as predictors for conditions and/or outcomes).

While there have been shown and described various novel features of the invention as applied to particular embodiments thereof, it will be understood that various omissions and substitutions and changes in the form and details of the systems, methods and media described and illustrated, may be made by those skilled in the art without departing from the spirit of the invention. For example, the various method steps described herein may be reordered, combined, or omitted where applicable. Those skilled in the art will recognize, based on the above disclosure and an understanding therefrom of the teachings of the invention, that the particular hardware and devices that are part of the invention, and the general functionality provided by and incorporated therein, may vary in different embodiments of the invention. Accordingly, the particular systems, methods and results shown in the figures are for illustrative purposes to facilitate a full and complete understanding and appreciation of the various aspects and functionality of particular embodiments of the invention as realized in system and method embodiments thereof. Any of the embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the present application may be implemented in hardware and/or software. Those skilled in the art will appreciate that the invention can be practiced in other than the described embodiments, which are presented for purposes of illustration and not limitation, and the present invention is limited only by the claims which follow.

What is claimed is:

1. A system for classifying information, the system comprising:
    at least one computing device having a processor and physical memory, the physical memory storing instructions that cause the processor to:
    receive an identification of a relevant document;
    select a first set of documents from a document collection, wherein the document collection is stored on a non-transitory storage medium;
    assign a first set of default classifications to documents in the first set of documents to be used as a training set along with the relevant document;
    train a classifier using the training set;
    score one or more documents in the document collection using the classifier;
    upon determining that a stopping criteria has been reached, classify one or more documents in the document collection using the classifier;
    upon determining that a stopping criteria has not been reached, select a second set of documents having a batch size for presenting to a reviewer for review prior to repeating the step of training the classifier;
    present one or more documents in the second set of documents to the reviewer;
    receive from the reviewer user coding decisions associated with the presented documents;
    add one or more of the documents presented to the reviewer for which user coding decisions were received to the training set;
    remove one or more documents in the first set of documents from the training set;
    add a third set of documents from the document collection to the training set;
    assign a second set of default classifications to one or more documents in the third set of documents;
    update the classifier using one or more documents in the training set;
    increase the batch size of documents selected for the second set of documents; and
    repeat the steps of training, scoring and determining whether a stopping criteria has been reached;
    wherein the first and second set of default classifications are presumptively assigned classifications used for the purpose of training the classifier in order to form a decision boundary, the presumptively assigned classifications not being based on a review; and wherein the one or more documents in the first set of documents removed from the training set are documents previously assigned a presumptively assigned classification.

2. The system of claim 1, wherein the number of documents presented for review is increased between iterations.

3. The system of claim 2, wherein the increase is 10%.

4. The system of claim 2, wherein the batch size is increased exponentially between iterations.

5. The system of claim 1, wherein the number of documents presented for review is varied between iterations or is selected to achieve an effectiveness target.

6. The system of claim 1, wherein the stopping criteria is the exhaustion of the first set of documents.

7. The system of claim 1, wherein the stopping criteria is a targeted level of recall.

8. The system of claim 1, wherein the stopping criteria is a targeted level of $F_1$, where $F_1$ is a measure that combines recall and precision.

9. The system of claim 1, further comprising instructions that cause the processor to sort the scored documents and present to the reviewer the highest scored documents for review.

10. The system of claim 1, wherein the presumptively assigned classification assigned to documents in the first set or second set of default classifications is "non-relevant".

11. The system of claim 1, wherein the documents in the first or third sets are selected randomly.

12. The system of claim 1, wherein the identified relevant document is a synthetic document.

13. The system of claim 1, wherein the presumptively assigned classification is a temporary label that is used to train the classifier, and the presumptively assigned classification is not based on actual determination of relevance by the reviewer.

14. A computerized method for classifying information, the method comprising:
    receiving an identification of a relevant document;
    selecting a first set of documents from a document collection, wherein the document collection is stored on a non-transitory storage medium;
    assigning a first set of default classifications to documents in the first set of documents to be used as a training set along with the relevant document;
    training a classifier using the training set;
    scoring one or more documents in the document collection using the classifier;
    upon determining that a stopping criteria has been reached, classifying one or more documents in the document collection using the classifier;
    upon determining that a stopping criteria has not been reached, selecting a second set of documents having a batch size for presenting to a reviewer for review prior to repeating the step of training the classifier;
    presenting one or more documents in the second set of documents to the reviewer;
    receiving from the reviewer user coding decisions associated with the presented documents;
    adding one or more of the documents presented to the reviewer for which user coding decisions were received to the training set;
    removing one or more documents in the first set of documents from the training set;
    adding a third set of documents from the document collection to the training set;
    assigning a second set of default classifications to one or more documents in the third set of documents;
    updating the classifier using one or more documents in the training set;
    increasing the batch size of documents selected for the second set of documents; and
    repeating the steps of training, scoring and determining whether a stopping criteria has been reached;
    wherein the first and second set of default classifications are presumptively assigned classifications used for the purpose of training the classifier in order to form a decision boundary, the presumptively assigned classifications not being based on a review; and wherein the one or more documents in the first set of documents removed from the training set are documents previously assigned a presumptively assigned classification.

15. The method of claim 14, wherein the number of documents presented for review is increased between iterations.

16. The method of claim 15, wherein the increase is 10%.

17. The method of claim 14, wherein the batch size is increased exponentially between iterations.

18. The method of claim 14, wherein the number of documents presented for review is varied between iterations or is selected to achieve an effectiveness target.

19. The method of claim 14, wherein the stopping criteria is the exhaustion of the first set of documents.

20. The method of claim 14, wherein the stopping criteria is a targeted level of recall.

21. The method of claim 14, wherein the stopping criteria is a targeted level of $F_1$, where $F_1$ is a measure that combines recall and precision.

22. The method of claim 14, further comprising sorting the scored documents and presenting to the reviewer the highest scored documents for review.

23. The method of claim 14, wherein the presumptively assigned classification assigned to documents in the first set or second set of default classifications is "non-relevant".

24. The method of claim 14, wherein the documents in the first or third sets are selected randomly.

25. The method of claim 14, wherein the identified relevant document is a synthetic document.

26. The method of claim 14, wherein the presumptively assigned classification is a temporary label that is used to train the classifier, and the presumptively assigned classification is not based on actual determination of relevance by the reviewer.

* * * * *